United States Patent
Lagre

(10) Patent No.: US 11,273,840 B2
(45) Date of Patent: Mar. 15, 2022

(54) CATEGORIZATION OF VEHICLES IN THE SURROUNDINGS OF A MOTOR VEHICLE

(71) Applicant: Valeo Schalter und Sensoren GmbH, Bietigheim-Bissingen (DE)

(72) Inventor: Axel Lagre, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 203 days.

(21) Appl. No.: 16/341,599

(22) PCT Filed: Aug. 4, 2017

(86) PCT No.: PCT/EP2017/069770
§ 371 (c)(1),
(2) Date: Apr. 12, 2019

(87) PCT Pub. No.: WO2018/068917
PCT Pub. Date: Apr. 19, 2018

(65) Prior Publication Data
US 2019/0322285 A1 Oct. 24, 2019

(30) Foreign Application Priority Data
Oct. 13, 2016 (DE) ...................... 10 2016 119 502.2

(51) Int. Cl.
*B60W 50/00* (2006.01)
*G05D 1/00* (2006.01)

(52) U.S. Cl.
CPC ....... *B60W 50/0097* (2013.01); *G05D 1/0088* (2013.01); *B60W 2050/0052* (2013.01);
(Continued)

(58) Field of Classification Search
CPC ....... B60W 50/0097; B60W 2554/804; B60W 2050/0052; B60W 2520/10; B60W 2520/105; B60W 2520/14; G05D 1/0088
See application file for complete search history.

(56) References Cited

U.S. PATENT DOCUMENTS

| | | | |
|---|---|---|---|
| 2006/0041381 A1* | 2/2006 | Simon | G08G 1/166 701/301 |
| 2008/0288140 A1* | 11/2008 | Matsuno | B60W 40/04 701/41 |

(Continued)

FOREIGN PATENT DOCUMENTS

| | | |
|---|---|---|
| DE | 10257842 A1 | 11/2003 |
| DE | 102006012997 A1 | 9/2007 |

(Continued)

OTHER PUBLICATIONS

International Search Report and Written Opinion Issued in Corresponding PCT Application No. PCT/EP2017/069770, dated Nov. 30, 2017 (11 Pages with English Translation of International Search Report).

(Continued)

*Primary Examiner* — Ig T An
(74) *Attorney, Agent, or Firm* — Osha Bergman Watanabe & Burton LLP

(57) ABSTRACT

The invention relates to a method for operating a driver assistance system (2) of a motor vehicle (1) comprising a) sensing a plurality of vehicles (5a-5d) in the surroundings (6) of the motor vehicle (1) by means of a sensing device (3) of the driver assistance system (2); b) determining a respective driving parameter value for at least one driving parameter of the sensed vehicles (5a-5d) by means of a computing device (7) of the driver assistance system (2); c) categorizing the sensed vehicles (5a-5d) on the basis of the at least one driving parameter value, respectively determined for the sensed vehicles (5a-5d), in average vehicles (5a-5c) and in atypical vehicles (5d); d) collectively predicting an overall behaviour for a totality of the sensed average vehicles (5a-5c) on the basis of the driving parameter values determined for the average vehicles (5a-5c); and e) individually predicting a respective individual behaviour for the sensed (Continued)

atypical vehicles (5d) on the basis of the respective driving parameter value determined for the respective atypical vehicle (5d), in order to adapt a driving behaviour of the motor vehicle (1) in a road traffic situation or at least to permit this.

13 Claims, 1 Drawing Sheet

(52) U.S. Cl.
CPC ... *B60W 2520/10* (2013.01); *B60W 2520/105* (2013.01); *B60W 2520/14* (2013.01); *B60W 2554/804* (2020.02)

(56) References Cited

U.S. PATENT DOCUMENTS

| | | | |
|---|---|---|---|
| 2011/0200230 A1 | 8/2011 | Luke et al. | |
| 2013/0151058 A1* | 6/2013 | Zagorski | B60W 30/09 701/23 |
| 2016/0068156 A1* | 3/2016 | Horii | B60W 30/0956 701/28 |
| 2016/0347310 A1* | 12/2016 | Moran | G08G 1/16 |
| 2017/0240110 A1* | 8/2017 | Lopez-Hinojosa | G08G 1/096716 |
| 2021/0354729 A1* | 11/2021 | Ng | B60W 30/0953 |

FOREIGN PATENT DOCUMENTS

| | | | |
|---|---|---|---|
| DE | 102008003950 A1 | 7/2008 | |
| DE | 102011013774 A1 | 9/2012 | |
| DE | 102012210252 A1 | 12/2013 | |
| DE | 102012212339 A1 | 1/2014 | |
| DE | 102014002115 A1 * | 5/2015 | ............ B60W 40/04 |
| DE | 102014002115 A1 | 8/2015 | |
| EP | 2368216 B1 | 12/2012 | |
| EP | 2995519 A1 | 3/2016 | |

OTHER PUBLICATIONS

German Search Report Issued in German Application No. 102016119502.2, dated Jun. 29, 2017 (5 Pages).

* cited by examiner

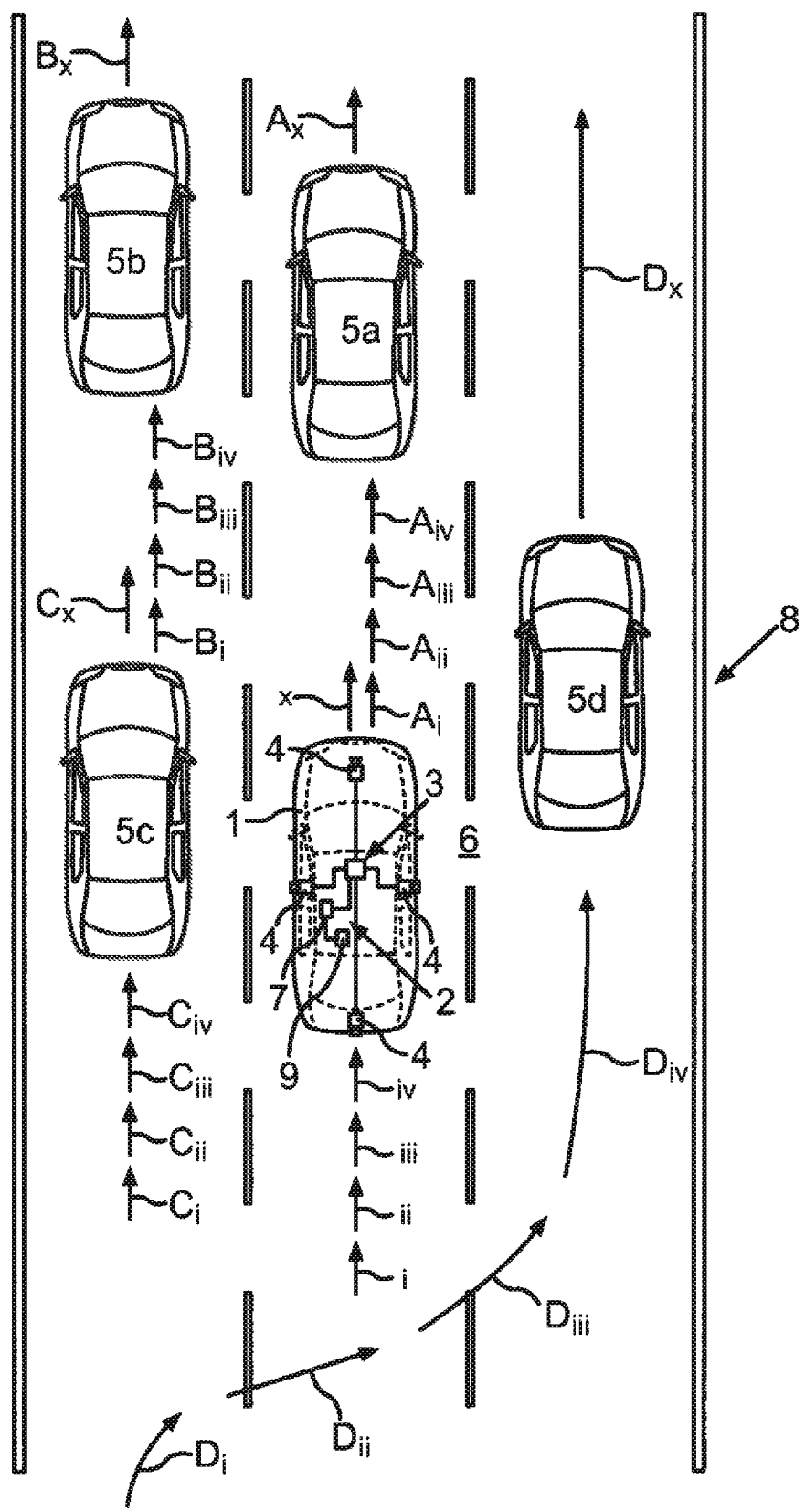

CATEGORIZATION OF VEHICLES IN THE SURROUNDINGS OF A MOTOR VEHICLE

The invention relates to a method for operating a driver assistance system of a motor vehicle and to a corresponding driver assistance system having a sensing device for sensing a plurality of vehicles in the surroundings of the motor vehicle and having a computing device for determining a respective driving parameter value for at least one driving parameter of the sensed vehicles.

Nowadays motor vehicles can basically be operated autonomously on the basis of a lane-keeping assistant and an adaptive cruise control system as well as further sensors. In this context there are many different approaches for actually implementing this. For example, a motor vehicle can follow a vehicle which is travelling ahead of it or follow a lane in which, for example, the vehicle travelling ahead is travelling. It is also possible to set a speed of the motor vehicle as a function of a navigation system and of road signs which are sensed by a camera, and much more. In this context, for example cameras can be used to detect vehicles, lanes or lane markings, road signs and the like using a corresponding downstream image processing system.

In this context, for example US 2013 015 1058 A1 discloses a method in which vehicles in the surroundings of the motor vehicle in question are sensed and the driving behaviour of these vehicles is respectively classified or categorized. In this context, possible dangerous situations which are located ahead of the motor vehicle in question and outside a sensing range of corresponding sensors of the motor vehicle in question are derived from the driving behaviour of the vehicles. For example, the driving behaviour of the vehicle in front can be imitated in order to avoid a dangerous situation.

The object of the present invention is to better adapt a driving behaviour of a motor vehicle to a traffic situation or at least to permit this.

This object is achieved by means of the subject matters of the independent patent claims. Advantageous embodiments arise from the dependent patent claims, the description and FIG. 1.

The invention relates to a method for operating a driver assistance system of a motor vehicle, having a series of method steps. One method step here is to sense a plurality of vehicles in the surroundings of the motor vehicle by means of a sensing device of the driver assistance system. This can be done, for example, with a camera or other sensors. Basically, the method is therefore used in situations in which a plurality of or even all of the vehicles are present in the surroundings. The method is therefore advantageously used, for example, in a traffic jam, on a motorway or a highway or in town traffic. A further method step is determining or acquiring at least one respective driving parameter value for at least one driving parameter of the sensed vehicles by means of a computing device of the driver assistance system. It is therefore possible, for example, to determine or calculate for the sensed vehicles, preferably for all the sensed vehicles, a respective speed value as a driving parameter value for the speed as a driving parameter on the basis of the data made available by the sensing device.

A further method step here is categorization, which can also be referred to as classification, of the sensed vehicles by the computing device on the basis of the at least one driving parameter value, respectively determined for the sensed vehicles, into average vehicles (inliers) and into atypical vehicle (outliers). It is also possible, for example, for the vehicles whose speeds lie outside a predefined speed interval to be classified or categorized as atypical vehicles, and for the vehicles whose speed lies inside the predefined speed interval to be classified or categorized as average vehicles.

As the next method steps, there now follows a collective prediction of an overall behaviour, which is also referred to as an overall traffic behaviour, for a totality of the sensed average vehicles on the basis of the driving parameter values determined for the average vehicles by means of the computing device. The collective prediction can therefore be carried out by means of the computing device on the basis of the totality of the driving parameter values determined for the average vehicles. In particular, in the totality of the sensed average vehicles or the totality of the driving parameter values determined for the average vehicles, a differentiation is no longer made between the individual average vehicles. It is therefore possible, for example, for a speed to be collectively predicted by means of an average speed or by means of a speed distribution with the mean value and standard deviation for the totality of the sensed averaged vehicles, that is to say all the average vehicles. In addition, the computing device makes an individual prediction of a respective individual behaviour for the sensed atypical vehicles on the basis of the respective driving parameter value which is determined for the respective atypical vehicle. It is therefore possible, for example, to individually predict the speed and therefore the individual behaviour of the vehicle on the basis of a series of speed values which were determined individually in the past. The individual prediction can also be made here for a single atypical vehicle or no atypical vehicle and can then be correspondingly omitted in the given traffic situation, as a function of the result of the categorization. The basic method of functioning of the method is described here, for which reason in the text which follows generally a plurality of atypical vehicles are referred to. In a specific implementation of the method, in this context just a single or even no atypical vehicle can be understood in this context in a given traffic situation.

Subsequently, for example as a further method step, the motor vehicle can be controlled as a function of the behaviour predicted for the average vehicles and for the atypical vehicles by means of the driver assistance system. In particular, a driving parameter value of a driving parameter of the motor vehicle in question, for example a speed and/or an acceleration and/or a yaw rate can be predefined as a function of the overall behaviour of the average vehicles. For example, in this way the driving parameter value, for example the speed and/or the acceleration of the motor vehicle and/or the yaw rate can be adapted to a corresponding driving parameter value of the average vehicles, for example a speed or average speed and/or an acceleration or average acceleration and/or to a yaw rate or average yaw rate. In this context, a further driving parameter of the motor vehicle in question, for example a distance from other vehicles or a readiness to brake is preferably carried out as a function of the individual behaviour predicted for the atypical vehicles. Alternatively or additionally to the controlling of the vehicle, a corresponding warning can also be output to a driver of the motor vehicle as a function of the predicted behaviour. The controlling or outputting of the warning can also be carried out, in particular, as a function of a traffic density which is then determined on the basis of the sensed vehicles.

Basically, the vehicles in the surroundings are therefore classified or categorised here in order to obtain a better overview of the traffic situation and to permit safer and more fluid driving. In this context, the differentiation is made between the general behaviour of the traffic, on the one hand, and vehicles which have a deviating or striking behaviour and which constitute a possible danger potential. This can include, for example, vehicles which overtake other vehicles and/or travel significantly more quickly than other vehicles and/or which change lane. As a result of the fact that the non-dangerous average vehicles which decisively determine the overall behaviour and whose behaviour is conversely well-described by the overall behaviour are collectively described as a totality, it is not necessary to make predictions individually for each of the average vehicles without, however, involving safety risks. This does not apply to the conspicuous atypical vehicles whose behaviour in traffic deviates considerably from the overall behaviour of the average vehicles, for which reason the respective individual behaviour, which is also referred to as individual traffic behaviour, is predicted for these individually. As a result, the described method is advantageous for predicting behaviour of all vehicles in detail, particularly in situations in which there is a high traffic density and owing to limited computational capacities it is not possible in the motor vehicle in question.

In one advantageous embodiment there is provision here that as a further method step the motor vehicle is controlled as a function of the behaviour predicted for the average vehicles and the atypical vehicles, by means of the driver assistance system in a partially autonomous or fully autonomous driving mode of the motor vehicle.

The method specified here is particularly suitable especially for a partially autonomous or fully autonomous driving mode, since a general intrinsic (driving) behaviour can be derived particularly well from the overall behaviour of the average vehicles, which intrinsic (driving) behaviour permits fluid and safe driving which is adapted to the other vehicles. As a result of the fact that the atypical vehicles can each be tracked and analysed individually, even dangerous situations can be very reliably predicted and correspondingly avoided with a low computing capacity. For this purpose, the respective individual behaviour of the atypical vehicles can also be subjected to further, already established analysis steps which are not to be explained here. The proposed method can therefore be combined particularly well with existing procedures.

In a further embodiment there is provision that the at least one driving parameter comprises a yaw rate and/or a speed and/or acceleration and/or a lane change frequency and/or an overtaking frequency and/or a further driving parameter of the respective sensed vehicle.

This has the advantage that the specified driving parameters categorize particularly well a behaviour of the traffic. It is therefore possible to categorize the sensed vehicles particularly appropriately, which correspondingly allows particularly safe driving of the motor vehicle to be implemented in motor vehicle traffic.

In a further advantageous embodiment there is provision here that the categorization and/or the collective prediction comprises forming a distribution and/or a mean value and/or a variance of the respective driving parameter values of the at least one driving parameter. In particular, in the case of the collective prediction there can be provision here to form a distribution and/or a mean value and/or a variance of the driving parameter values of the average vehicles, preferably only of the average vehicles.

This has the advantage that outliers and correspondingly atypical vehicles can therefore be identified particularly easily during the categorization. During the collective prediction, it is therefore easily possible to quantify an, in particular present, overall behaviour of the vehicles, especially of the average vehicles. In this way, an overview of the traffic can be easily obtained.

In a further advantageous embodiment there is provision that the categorization is carried out using a statistical method, which can also be referred to as an algorithm, for detecting errors and/or deviations in a set of data points. In particular, the categorization can be carried out using the so-called RANSAC algorithm or Random Sample Consensus Algorithm, which can also be translated as "correspondence with a random sample" algorithm and/or a maximum likelihood-like estimator of a so-called M estimator and/or a so-called support vector machine (SVM). When a support vector machine is used, an elliptical envelope curve can be provided here. In this context, the errors and/or deviations of the statistics can correspond to the atypical vehicles in the total set of sensed vehicles.

This has the advantage that the atypical vehicles and therefore also the average vehicles can be determined particularly quickly and reliably. This can also be implemented in real time and with particularly low computational expenditure.

In a particularly advantageous embodiment there is provision that the sensing, determination and categorization, in particular also the collective prediction and the individual prediction as well as, if appropriate, also the control are/is carried out iteratively and/or continuously and in the process the sensed vehicles are buffered, for example in the form of a logical representation of the sensed vehicles, with the associated determined driving parameter values in a buffer of the computing device. In particular, the sensed vehicles with the associated determined driving parameter values can be provided here with a time stamp. It is already possible here for the actual driving parameter values, which are buffered, for example, in the form of a table, to be considered as a logic representation of the sensed vehicles. Furthermore, the categorization, the collective prediction and the individual prediction and, in particular, also if appropriate the control is carried out on the basis of the, in particular all the, buffered sensed vehicles with the buffered determined driving parameter values. In this context, for example vehicles with the associated determined driving parameter values or driving parameter values can be deleted from the buffer and no longer used for the categorization and prediction of the overall behaviour and of the setting behaviour. For example, the deletion of driving parameter values can be carried out automatically after a predefined time, that is to say for driving parameter values which have reached a predefined maximum age.

This has the advantage that not only the vehicles which are sensed at a given point in time are taken into account but also the vehicles which are sensed over a period of time are taken into account. Therefore, the statistics are considerably improved, with the result that the quality of the prediction can be increased. In this context, the up-to-dateness of the prediction can be ensured by means of automatic deletion of the determined driving parameter values after a predefined time.

In one advantageous embodiment there is provision here that a proportion of the average vehicles in the buffered sensed vehicles is determined and it is checked, and if the proportion is lower than a predefined limiting value, in particular lower than 50 percent or lower than 70 percent, on the one hand at least the one average vehicle with the oldest time stamp and the at least one associated driving parameter value are deleted from the buffer and then, on the other hand, the categorization is carried out anew. In particular, a predefined number of more than one average vehicle with the oldest time stamps can be deleted. In particular, the determination and checking of the proportion of the average vehicles in the sensed vehicles can also be carried out anew.

It can therefore be ensured that obsolete data of vehicles which are sensed in a qualitatively different traffic situation do not adversely affect the method. By selecting the predefined limiting value, a minimum quality of the method with maximum statistical validity, that is to say the highest possible number of sensed vehicles, can be implemented. If the proportion of the average vehicles drops below the predefined limiting value, the average vehicles are then no longer representative of the overall traffic and there are correspondingly too many atypical vehicles, which is an indication that an assumption about the average vehicles during the categorization, for example a hypothesis of the support vector machine, should be adapted.

In a further preferred embodiment there is provision here that atypical vehicles with the associated determined driving parameter values which are no longer sensed in a current iteration step are deleted from the buffer. In this context, driving parameter values which were determined in the past are not deleted for sensed vehicles and therefore continue to be kept available in the buffer. Therefore, in particular only atypical vehicles with a time stamp are not deleted, and therefore during the categorization and the individual prediction it is taken into account which vehicles have a time stamp which corresponds to the current iteration step. Therefore, only atypical vehicles or their driving parameter values which were sensed in the last time step or the last iteration step are taken into account.

Therefore, atypical vehicles which are no longer in the sensing range of the motor vehicle and therefore no longer constitute a direct potential danger are no longer taken into account. Correspondingly, this does not falsify a result of categorization and also no longer ties up resources of the computing device.

In a further advantageous embodiment there is provision that the collective prediction and/or the individual prediction are/is carried out using a prediction filter. In particular, the prediction can be carried out using a Kalman filter and/or an alpha-beta filter. The alpha-beta filter here is also known as an F-G or G-H filter.

The specified filters have the advantage that they can be used to predict particularly well a future overall behaviour of the totality of the average vehicles, that is to say an overall behaviour of the general traffic and/or a future individual behaviour of an atypical vehicle. Therefore, the driver's own driving behaviour can also be adapted particularly well to the general traffic or to the atypical vehicles as potential sources of danger.

In one particularly advantageous embodiment there is provision that the individual behaviour of the at least one sensed adjacent vehicle with the shortest distance from the motor vehicle in question is predicted individually independently of the categorization of the vehicle with the shortest distance as an average vehicle or atypical vehicle on the basis of the driving parameter value determined for the adjacent vehicle. Correspondingly, the sensed vehicles can be categorized or classified here into three classes, specifically into the adjacent vehicles in addition to the average vehicles and the atypical vehicles. Especially the adjacent vehicles with the shortest distance from the motor vehicle in question are particularly large potential sources of danger.

This has the advantage that the vehicle with the shortest distance from the motor vehicle, the adjacent vehicle or vehicles, is also individually predicted in respect of its individual behaviour, with the result that an accident with said vehicle can be particularly well prevented.

In one particularly advantageous embodiment there is provision that a driving parameter of the motor vehicle, in particular a yaw rate or a speed and/or an acceleration and/or a distance from one of the sensed vehicles and/or an object in the surroundings of the motor vehicle are/is adapted proportionally to the predicted overall behaviour and to the individual behaviour which is predicted for the sensed adjacent vehicle with the shortest distance. This can occur, for example, by means of a weighting. Therefore, for example 70% of a speed of the motor vehicle in question can be determined on the basis of a speed of the vehicle in front and 30% of the speed of the motor vehicle in question can be determined on the basis of the speed of average vehicles, for example an average speed of the average vehicles.

This has the advantage that the vehicle or the driver of the motor vehicle can orient himself, on the one hand, towards a general behaviour of the other road users, for example towards a traffic flow, and at the same time the vehicle in front is taken into account to a degree corresponding to its danger potential, in order to implement safe and fluid driving.

In a further advantageous embodiment there is provision that during the collective prediction the overall behaviour is characterized on the basis of an overall driving parameter value for the respective at least one driving parameter which is generated or formed from the determined driving parameter values. In particular, the overall behaviour can be characterized here on the basis of in each case just one or in each case just two overall driving parameter values for the respective at least one driving parameter. It is therefore possible, for example, for the overall behaviour to be characterized on the basis of a speed mean value and a speed deviation as respective driving parameter values for the speed as a driving parameter.

This has the advantage that the overall behaviour of the traffic is characterized particularly easily and nevertheless a high quality of prediction is achieved.

In one particularly advantageous embodiment there is provision that the sensed atypical vehicles are evaluated and prioritized with respect to their danger potential according to or in accordance with a predefined criterion which comprises, in particular, a distance from the motor vehicle in question and/or one or more of the driving parameters, in particular a a yaw rate and/or a speed and/or an acceleration and/or a lane-changing frequency and/or an overtaking frequency, and the individual behaviour is predicted individually only for a predefined or predefinable number of the sensed atypical vehicles which have the highest priority, with the result that the atypical vehicles with the highest danger potential are monitored.

This has the advantage that the necessary computing capacity is reduced further and in the process the most dangerous atypical vehicles in the surroundings of the motor vehicle continue to be sensed precisely and their individual behaviour is predicted.

The basic idea of the invention can therefore be considered to be classifying vehicles in the surroundings of the motor vehicle in order to obtain an overview over the current traffic situation, and therefore permitting safe and as far as possible uniform driving, for example autonomous driving. The vehicles in the surroundings can be divided here into three groups, specifically into average vehicles (inliers), atypical vehicles (outliers) and adjacent vehicles (closest cars), to be precise on the basis of respective properties or driving parameters of the corresponding vehicles, such as, for example, the speed, acceleration, yaw rate or a distance from the motor vehicle in question.

The average vehicles represent here the general traffic behaviour. In this context, the next steps of the general traffic behaviour, of the overall behaviour, can be predicted with a filter. The atypical vehicles represent the outliers from the group of the average vehicles. These can stand out, for example, as a result of a relatively high speed or frequent lane changes and are categorized as potential dangers. Therefore, each vehicle which is categorized as an atypical vehicle is monitored individually, that is to say respective individual behaviour is predicted individually. When there are many vehicles which are categorized as atypical vehicles it is possible to perform a prioritization process here. For each of the monitored atypical vehicles, their individual behaviour is predicted individually with a filter. The adjacent vehicles represent the vehicles which are located in the closest surroundings of the motor vehicle. The intention here is, in particular, to avoid accidents with the adjacent vehicles. The individual behaviour of the adjacent vehicles can also be predicted individually with a separate filter here.

Overall, it is therefore possible for the proposed method to be used, on the one hand, to analyse and predict the general traffic flow and to adapt the motor vehicle's own behaviour to the latter and, on the other hand, to detect or predict in good time potential dangers in the form of the atypical vehicles or else as a result of adjacent vehicles, with the result that safe and constant driving, for example safe and constant autonomous driving, is made possible.

The invention also relates to a driver assistance system for a motor vehicle, having a sensing device for sensing a plurality of vehicles in the surroundings of the motor vehicle and having a computing device for determining a respective driving parameter value for at least one driving parameter of the sensed vehicles. It is important here that the computing device is designed to categorize the sensed vehicles on the basis of the at least one driving parameter value respectively determined for the sensed vehicles, into average vehicles and into atypical vehicles, and to predict collectively an overall behaviour for a totality of the sensed average vehicles on the basis of the driving parameter values determined for the average vehicles, and to predict individually a respective individual behaviour for the sensed atypical vehicles on the basis of the respective driving parameter value determined for the respective atypical vehicle.

The invention also relates to a head-up display which is designed to carry out a method according to the invention or an advantageous embodiment of the method according to the invention.

Advantages and advantageous embodiments of the driver assistance system correspond here to advantages and advantageous embodiments of the method for operating a driver assistance system.

The invention also relates to a motor vehicle having such a driver assistance system.

Further features of the invention emerge from the claims, the FIG. 1 and the description of FIG. 1. The features and combinations of features specified above in the description and the features and combinations of features which are specified below in the description of the FIGURE and/or shown only in the FIGURE can be used not only in the respectively specified combination but also in other combinations without departing from the scope of the invention. Therefore, embodiments of the invention which are not explicitly shown or explained in the FIGURE, but arise from and can be generated from the explained embodiments by means of separate combinations of features, are considered to be included and disclosed. Embodiments and combinations of features which therefore do not have all the features of an originally formulated independent claim are also considered to be disclosed. Moreover, embodiments and combinations of features, which go beyond, or depart from, the combinations of features presented in the back-references of the claims, are to be considered to be disclosed, in particular by the embodiments presented above.

Exemplary embodiments of the invention are explained in more detail below on the basis of a schematic drawing. The single FIG. 1 shows here a motor vehicle having an exemplary embodiment of a driver assistance system in an example scenario on the basis of which an exemplary method for operating the driver assistance system is explained.

In FIG. 1, an exemplary scenario from a bird's eye view is illustrated. A motor vehicle 1 is equipped here with a driver assistance system 2 which comprises a sensing device 3 which is embodied here as an optical sensing device with a multiplicity of cameras 4, and serves to sense vehicles in the surroundings 6 of the motor vehicle 1, as well as being equipped with a computing device 7 for determining a respective driving parameter value for at least one driving parameter of the sensed vehicles 5a to 5d.

The computing device 7 is designed here to categorize the sensed vehicles 5a to 5d on the basis of the at least one driving parameter value, for example a speed value and a lane changing frequency, respectively determined for the sensed vehicles 5a to 5d, into average vehicles 5a to 5c and atypical vehicles 5d. The computing device 7 is also designed to predict collectively an overall behaviour for a totality of the sensed average vehicles 5a to 5c, for example an average speed as well as here a corresponding standard deviation for the average speed on the basis of the driving parameter values, for example the individual speed values, determined for the average vehicles 5a to 5c, and to predict individually a respective individual behaviour for the sensed atypical vehicles 5d, which in the example shown involves a single vehicle, on the basis of the respective driving parameter value determined for the respective atypical vehicle 5d. In the example shown, an average speed with a corresponding standard deviation is therefore determined collectively for the vehicles 5a to 5c from the respectively determined individual speed of the vehicles 5a to 5c, and on the basis of this standard deviation the speed of the average vehicles 5a to 5c is predicted, and the general behaviour of the vehicle is predicted as a function of the average speed. On the basis of this prediction, for example a speed for the motor vehicle 1 can be predefined by the driver assistance system 2, or a corresponding recommendation can be output to the driver of the motor vehicle 1. It is also possible, for example, to predefine a minimum distance which has to be complied with between the motor vehicle 1 and the other vehicles 5a-5d.

For the atypical vehicle 5d, averaging or the like is not carried out, but instead each atypical vehicle 5d is sensed separately in respect of its individual behaviour, and a respective individual behaviour of the corresponding atypical vehicle, here of the one atypical vehicle 5d, is individually predicted from the individual behaviour of said vehicle. The corresponding prediction result can be used to avoid a dangerous situation, for example to increase a distance from the atypical vehicle 5d or to reduce a velocity or to output a warning to the driver of the motor vehicle 1.

This method will now be explained in detail below once more with reference to the example shown. The motor vehicle 1 is moving in this case on the middle lane of a three-lane road at a constant speed. A first vehicle 5a is also moving at a constant speed on the middle lane ahead of the motor vehicle 1. Two further vehicles, the second and the third vehicles 5b and 5c, are also moving at a constant speed, but on the left-hand lane next to and obliquely ahead of the motor vehicle 1. A fourth vehicle 5d is moving in this case at a high speed on the right-hand lane obliquely in front of the motor vehicle 1. The driving behaviour and the driving path in the past are represented for the motor vehicle 1 and the vehicles 5a to 5d by means of respective arrows i to iv, Ai to Aiv, Bi to Biv, Ci to Civ as well as Di to Div. The arrow Ai therefore symbolizes the position and behaviour of the first vehicle 5a at the time i, the arrow Bi symbolizes the position and behaviour of the second vehicle 5b at the time i, and so on, wherein the position and behaviour of the motor vehicle 1 at the times i to iv are symbolized by the arrows i to iv. A relatively long arrow stands here for a relatively high speed. The respective vehicles 5a to 5d are sensed here by the sensing device 3 for all the times i to iv. In this case, for example a speed and a lane change or a lane change frequency are therefore detected. The driving parameter values for the corresponding driving parameters, which can also additionally comprise a yaw rate or an acceleration or other driving parameters, are determined by the computing device 7 and buffered in this case for each vehicle 5a to 5d in a buffer 9. In this case, by means of a statistical method such as, for example, the RANSAC algorithm (Random Sample Consensus Algorithm), it is now determined on the basis of these buffered data items which of the vehicles 5a to 5d are outliers and therefore atypical vehicles and which of the vehicles can be described well by a global behaviour and are therefore average vehicles. In this case, the fourth vehicle 5d is categorized on the basis of its increased speed and the frequent and rapid lane changes as an outlier and therefore an atypical vehicle 5d.

It is important here that, by checking a proportion of the average vehicles 5a to 5c of the buffered sensed vehicles 5a to 5d, checking is carried out to ensure the up-to-dateness of the data and to ensure that the statistical methods or a result thereof are not falsified by old data which originates for example from a completely different driving situation. If it is detected that a majority, for example more than 50%, of the vehicles are average vehicles, their behaviour in the preceding time steps i to iv was able to be described well as a totality by the statistical methods, all the sensed vehicles are retained in the buffer 9. If, in contrast, the example shown is not the case, the oldest stored vehicle data, that is to say, for example, the driving parameter values which are stored in the time step i in this case, can be deleted and the categorization can be carried out once more. Furthermore, old atypical vehicles which are no longer located in the surroundings 6 of the vehicle, that is to say are no longer sensed by the sensing device 3, are deleted from the buffer 9 in this case. The behaviour of such old vehicles can no longer serve to avoid a dangerous situation.

At this point, the sensed vehicles 5a to 5d will now be divided into two categories or classes, specifically the average vehicles 5a to 5c and the atypical vehicles, here just the one vehicle 5d.

The average vehicles 5a to 5d are now used to determine a general behaviour, referred to as an overall behaviour, of the traffic, here an average speed with a corresponding standard deviation. From this behaviour it is possible to derive, for example, a future driving behaviour of the motor vehicle 1 in question, for example a speed, if said vehicle is in a partially autonomous or fully autonomous driving mode. The future driving behaviour is symbolized here by the arrow x. Of course, just one item of information or a plurality of further items of information, for example information about the driving behaviour of the vehicle 5a directly ahead of the motor vehicle 1, can also be used, but this is not explained further at this point. Alternatively, a corresponding warning or recommendation can also be output to the driver of the motor vehicle 1. A filter is then applied to the determined overall behaviour of the totality of the sensed average vehicles 5a to 5c in order to predict the overall behaviour in a future time step x. This is illustrated in the present case in the drawing by means of the arrows Ax, Bx, Cx.

The atypical vehicles, here the one atypical vehicle 5d, are here the vehicles which have been sensed in the last time step iv, and which are therefore still located in the surroundings 6 of the motor vehicle 1 and do not belong to the average vehicles 5a to 5c, This means that the atypical vehicles 5d have a behaviour or traffic behaviour which differs significantly from the general traffic behaviour or overall behaviour. These are typically vehicles which travel more quickly, overtake or carry out lane changes. A separate filter, for example a Kalman filter or an alpha-beta filter, are now used for each of the atypical vehicles 5d, in order to estimate the driving behaviour Dx in a subsequent time step x of this potentially dangerous vehicle 5d. In this context, further analysing steps can also be carried out in order to better predict the future behaviour Dx. Since these atypical vehicles 5d could represent a danger in the relatively near future, this should be taken into particular account by the driver assistance system 2. If the driver assistance system 2 does not have sufficient computing capacity to monitor all the vehicles in the surroundings 6 of the motor vehicle 1, the atypical vehicles 5d should have a high processing priority.

Finally, the adjacent vehicle 5c, here the third vehicle 5c, can additionally be determined. The behaviour of the respective adjacent vehicle 5c should also be predicted individually with a corresponding filter, in order correspondingly to determine here the behaviour of the motor vehicle 1 in the partially autonomous or autonomous driving mode or output a corresponding warning and therefore avoid accidents. The adjacent vehicle 5c can therefore be treated together with the atypical vehicle 5d as a potential source of danger and as a result be taken into account individually within the scope of the described method, in order to avoid accidents and drive fluidly and uniformly.

The average vehicles 5a to 5c behave in accordance with the general overall behaviour of the traffic and help the driver assistance system 2 to obtain a better overview over the overall behaviour of the traffic. They supply the system with fundamental average data such as the average speed, yaw rate and the like. This overall behaviour can be used to determine the behaviour of the motor vehicle 1, for example as a function of the vehicle in front, here the first vehicle 5a. It is therefore possible, for example, for the motor vehicle in question to orientate itself toward the vehicle in front 5a and the average behaviour according to a weighting, for example to orientate itself by 70 percent toward the vehicle in front 5a and 30 percent toward the overall behaviour. Therefore, during the control of the autonomous vehicle or during the output of a warning, a general traffic flow is taken into account and at the same time individual sources of danger such as the atypical vehicles 5d or the adjacent vehicles 5c are taken into account.

The invention claimed is:

1. A method for operating a driver assistance system of a motor vehicle, comprising:
   a) sensing a plurality of vehicles in the surroundings of the motor vehicle by a sensing device of the driver assistance system;
   b) determining respective physical driving parameter values for at least one driving parameter of the sensed vehicles by a computing device of the driver assistance system calculating acquired sensor information to form at least one of a distribution, a mean value and a variance of the physical driving parameter values of the at least one driving parameter;
   c) categorizing the sensed vehicles on the basis of at least a comparison, with respect to a pre-defined numerical interval, of the distribution, the mean value and/or the variance of the physical driving parameter values, respectively determined for the sensed vehicles, into average vehicles and in atypical vehicles,
   d) collectively predicting an overall behavior for a totality of the sensed average vehicles on the basis of the physical driving parameter values determined for the average vehicles, wherein during the collective prediction the overall behavior is characterized on the basis of an overall physical driving parameter value for the respective at least one driving parameter which is generated from the determined physical driving parameter values determined for the average vehicles;
   e) individually predicting a respective individual behavior for the sensed atypical vehicles on the basis of the respective physical driving parameter value determined for the respective atypical vehicle; and
   f) controlling of the vehicle as a function of the behavior predicted for the average vehicles and for the atypical vehicles by the driver assistance system in a partially autonomous or fully autonomous driving mode.

2. The method according to claim 1, wherein the at least one driving parameter comprises a yaw rate and/or a speed and/or an acceleration and/or a lane change frequency and/or an overtaking frequency of the respective sensed vehicle.

3. The method according to claim 1, wherein the categorization according to method step c) is carried out using a statistical method for detecting errors and/or deviations in a set of data points, in particular using the RANSAC algorithm and/or a maximum likelihood- like estimator and/or a support vector machine.

4. The method according to claim 1, wherein at least the method steps a) to e), are carried out iteratively and in the process the sensed vehicles are buffered with the associated determined driving parameter values in a buffer, provided with a time stamp, and the method steps c) to e) are carried out on the basis of buffered sensed vehicles with the buffered determined driving parameter values.

5. The method according to claim 4, wherein the proportion of average vehicles in the buffered sensed vehicles is checked, and if the proportion is lower than a predefined limiting value of 50%, at least the one average vehicle with the oldest time stamp and the at least one associated driving parameter value are deleted from the buffer and the categorization is then carried out anew according to method step c).

6. The method according to claim 4, wherein atypical vehicles which are no longer sensed in an iteration step are deleted from the buffer.

7. The method according to claim 1, wherein the collective prediction according to method step d) and the individual prediction according to method step e) are carried out using a prediction filter, comprising a Kalman filter and/or an alpha-beta filter.

8. The method according to claim 1, wherein the individual behavior of the at least one sensed vehicle with the shortest distance from the motor vehicle is predicted individually.

9. The method according to claim 8, wherein a driving parameter of the motor vehicle selected from a yaw rate, a speed, an acceleration, a distance from one of the vehicles, and an object in the surroundings of the motor vehicle is adapted proportionally to the predicted overall behavior and to the individual behavior which is predicted for the sensed vehicle with the shortest distance.

10. The method according to claim 1, wherein the sensed atypical vehicles are prioritized with respect to their danger potential according to a predefined criterion which comprises a distance from the motor vehicle and/or one or more of the driving parameters, and the individual behavior is predicted individually only for a predefined number of the sensed atypical vehicles.

11. The method according to claim 1, wherein the categorizing according to method step c) comprises:
   identifying at least a first vehicle of the sensed vehicles that has the respective driving parameter value within a predefined interval in the distribution of the physical driving parameter values as belonging to the average vehicles;
   identifying at least a second vehicle of the sensed vehicles that has the respective driving parameter value outside of the predefined interval in the distribution of the physical driving parameter values as belonging to the atypical vehicles.

12. Driver assistance system for a motor vehicle, comprising:
   a sensing device for sensing the vehicles in the surroundings of the motor vehicle; and
   a computing device for determining respective physical driving parameter values for at least one driving parameter of the sensed vehicles by calculating acquired sensor information to form a distribution and/or a mean value and/or a variance of the physical driving parameter values of the at least one driving parameter;
   wherein the computing device is configured to categorize the sensed vehicles on the basis of at least a comparison, with respect to a pre-defined numerical interval, of the distribution and/or a mean value and/or a variance of the physical driving parameter values respectively determined for the sensed vehicles, into average vehicles and into atypical vehicles, and to predict collectively an overall behavior for a totality of the sensed average vehicles on the basis of the physical driving parameter values determined for the average vehicles, and to predict individually a respective individual behavior for the sensed atypical vehicle on the basis of the respective physical driving parameter value determined for the respective atypical vehicle, and control of the vehicle as a function of the behavior predicted for the average vehicles and for the atypical vehicles in a partially autonomous or fully autonomous driving mode; and
   wherein during the predicting collectively the overall behavior is characterized on the basis of an overall physical driving parameter value for the respective at least one driving parameter which is generated from the determined physical driving parameter values determined for the average vehicles.

13. A motor vehicle having a driver assistance system according to claim 12.

\* \* \* \* \*